(No Model.)

J. M. RICE.
VEHICLE WHEEL.

No. 574,940. Patented Jan. 12, 1897.

Attest:
Theodore Ferris
E. L. Price

Inventor.
James M. Rice, per
Henry J. Miller, Atty.

THE NORRIS PETERS CO., PHOTO-LITHO., WASHINGTON, D. C.

UNITED STATES PATENT OFFICE.

JAMES M. RICE, OF NEW ROCHELLE, NEW YORK.

VEHICLE-WHEEL.

SPECIFICATION forming part of Letters Patent No. 574,940, dated January 12, 1897.

Application filed March 9, 1896. Renewed December 15, 1896. Serial No. 615,808. (No model.)

*To all whom it may concern:*

Be it known that I, JAMES M. RICE, a citizen of the United States, residing at New Rochelle, in the county of Westchester and State of New York, have invented certain new and useful Improvements in Vehicle-Wheels, fully described in the following specification and represented in the accompanying drawings, forming a part of the same.

This invention relates to an improvement in that class of vehicle-wheel tires which are constructed in two annular concentric portions with interposed springs, whereby the outer portion is adapted to yield in compensation for inequalities of the road under the load applied to the wheel-hub. Heretofore it has been proposed to apply springs of various forms between such relatively-movable portions of the tire, none of which have afforded a yielding support between said members of the requisite uniformity of operation under compression.

The object of the present improvement is partly to provide around the entire circumference and intermediate to such normally concentric portions of the tire a uniform yielding resistance to their relative displacement and distribute the temporary stress upon any point of the tire over a large proportion of the circumference, whereby to adapt the interposed springs to be made of light spring-wire in order to render the wheel more sensitive to inequalities of the road, partly to improve the specific construction of said concentric parts and to seal the intervening space from the penetration of dust and other foreign matter, and partly to provide a simple and effective means of securing the nipples to the rim of the wheel.

The invention consists in the particular improvements herein shown and described, and specifically set forth in the claims annexed.

Figure 1:
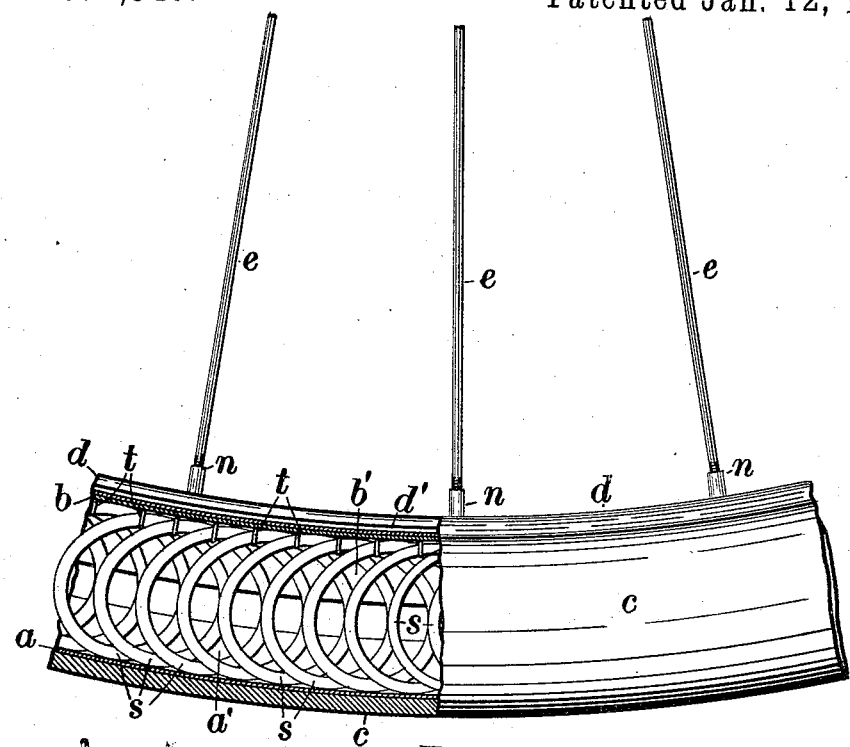
Figures 2, 3:
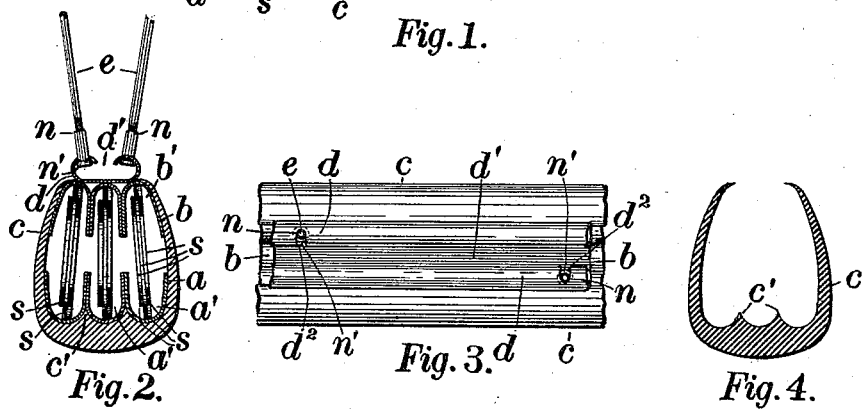
Figure 4:
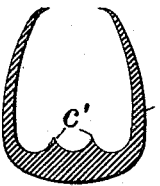
Figure 5:
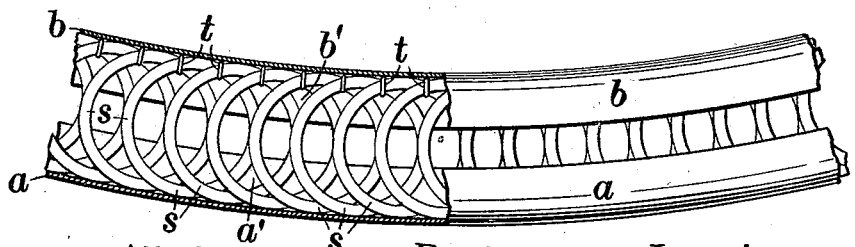

In the drawings, Figure 1 is an elevation of a portion of a bicycle-wheel embodying my improvement, partly in section where hatched. Fig. 2 is a transverse section of the same, taken through one of the spokes. Fig. 3 is a plan of a portion of the tire, showing the adjacent ends of two of the spokes in transverse section, with nipples having their heads in engagement with the rim $d$. Fig. 4 is a transverse section of the rubber shoe or sheath enveloping the concentric confining-rings for the springs, and Fig. 5 is an elevation similar to Fig. 1 of a portion of a connected overlapping series of separate circular coils of wire inclosed within the inner and outer rings of the tire.

Referring to Figs. 1 to 4, inclusive, the tire is constructed of tubular form and is shown divided into two independently-movable and relatively concave rings $a$ and $b$, the one surrounding the other, formed internally with opposed annular channels or cavities $a'$ and $b'$, respectively, and are held in their normally concentric relation by means of the interposed continuous springs formed each of a series of overlapping coils $s$, constructed, preferably, of a continuous wire and united together at the inner side at the points where they overlap by means of suitable bands or clips $t$ to prevent the relative displacement of the coils of each series. By arranging the coils in overlapping relation points of support are afforded between the two incasing rings at close intervals, so as to provide a practically continuous yielding support between such members throughout their circumference, and said coils are made substantially circular, so as to not only touch the incasing hollow rings $a$ and $b$ in tangential relation, but to approach and recede from the points of contact therewith gradually, in order to confer extreme sensitiveness and provide for the increase of the area of contact when under compression and thereby render the line of contact of the consecutive coils continuous at such time. The overlapping of the coils obviously affords absolute freedom of action of each independently of the adjacent coils.

In Fig. 2 the parts $a$ and $b$ are shown formed each of three annular sheet-metal shells of U-shaped cross-section, secured together by brazing or other means, the insertion of the flat springs $s$ in the opposed cavities thus provided operating to steady such relatively-movable members when the wheel is in use; but it is obvious that the strength and rigidity of the tire may be varied by changing the number of springs employed or varying the size of spring-wire of which they are constructed. These springs are preferably formed of flat coils of wire of flattened cross-section in parallel relation to said coils, in order that the overlapped portions of the adjacent coils may have sufficient area of contact to prevent excessive wear by the continual rubbing to which they are subjected when the wheel is in use.

The rubber shoe or sheath c is of annular form and fitted to the exterior of the outer ring a and to the adjacent portion of the ring b, so as to practically envelop the skeleton frame of the tire formed by the members a and b and to close and seal the intervening space for the exclusion of dust and other foreign matter therefrom. The shoe c is provided in its inner periphery with annular tongues or ridges c', adapted to enter and engage the external annular recesses intermediate to the cavities a' in the outer ring for locking the same from lateral displacement when in position.

The rim d for attachment of the nipples n of the spokes e consists of a tubular sheet-metal ring having its inner side formed with annular lateral pockets and intermediate slit d' for the introduction of the heads n' of the nipples and lateral branches $d^2$ to said pockets disposed alternately on opposite sides of said slit at regular intervals to receive the nipples, whose heads are thereby locked within said lateral pockets.

It is obvious that in lieu of the series of overlapping coils s formed of a continuous wire the springs may be constructed of series of independent circular coils, as in Fig. 5, but disposed in the same relation.

In assembling the parts of the tire the rim d may be first secured to the inner member b by riveting or brazing and the springs applied to their respective cavities b', after which the two semicircular portions in which the outer ring a is preferably formed are secured together around such springs, when the shoe c may be applied and cemented to the exterior of said rings in the usual manner.

It will be observed that the peculiar cross-section of the members a and b, besides affording cavities for retaining the springs in their proper relation, confers strength and rigidity to enable them to retain their initial shape and thereby distribute the load upon the interposed springs throughout one-half of the circumference, and that the tubular form of the nipple strip or rim affixed to the inner member b serves, in addition to its normal function, to reinforce the said member to which it is attached.

Having thus set forth the invention, what I claim herein, and desire to secure by Letters Patent, is—

1. The tubular vehicle-wheel tire comprising two independently-movable and relatively concave rings, the one surrounding the other, and an interposed continuous wire spring formed of a series of flat overlapping circular coils for retaining the same in their normal concentric relation, said spring being inserted loosely between said rings with its consecutive coils fastened together on one side at the point of overlapping, as and for the purpose set forth.

2. The tubular vehicle-wheel tire comprising two independently-movable and relatively concave rings, the one surrounding the other, and an interposed continuous wire spring formed of a series of flat overlapping circular coils of flattened cross-section in parallel relation thereto, said spring being inserted loosely between said rings with its consecutive coils fastened together on one side at the point of overlapping, as herein shown and described and for the purpose set forth.

3. A tubular vehicle-wheel tire formed of two independent concentric rings, the one surrounding the other, with opposed annular internal cavities and intermediate external recesses, interposed continuous wire springs formed each of a connected series of flat overlapping coils retained within said cavities and a flexible rubber shoe enveloping the outer ring and the adjacent portion of the inner ring to close and seal the intervening space and having annular tongues upon its inner periphery adapted to enter and engage the external recesses of the outer ring, as and for the purpose set forth.

4. In a vehicle-wheel, the combination, with the spokes e and nipples n with heads n', of the concentric rings a and b formed with opposed internal cavities and intermediate external recesses as described, interposed wire springs s with flat overlapping coils retained within said cavities, the flexible rubber shoe c with annular tongues c' upon its inner periphery incasing said rings, and the tubular rim d formed with annular slit d' having lateral branches $d^2$ to receive the heads of said nipples, said rim being secured to the inner ring, substantially as herein shown and described and for the purpose set forth.

In testimony whereof I have hereunto set my hand in the presence of two subscribing witnesses.

JAMES M. RICE.

Witnesses:
M. L. DELAFIELD, Jr.,
FRANK B. ABRAMSON.